(12) United States Patent
Beer (10) Patent No.: US 6,669,552 B1
(45) Date of Patent: Dec. 30, 2003

(54) TELESCOPIC VENTLINE

(76) Inventor: Ralph G. Beer, P.O. Box 756, Columbus, MT (US) 59019

(*) Notice: Subject to any disclaimer, the term of this patent is extended or adjusted under 35 U.S.C. 154(b) by 0 days.

(21) Appl. No.: 10/269,672

(22) Filed: Oct. 10, 2002

Related U.S. Application Data (60) Provisional application No. 60/328,959, filed on Oct. 11, 2001.

(51) Int. Cl.[7] .................................................. E21F 1/00
(52) U.S. Cl. ........................ 454/171; 454/903; 454/306
(58) Field of Search ................................ 454/168, 171, 454/172, 903

(56) References Cited

U.S. PATENT DOCUMENTS

| | | | |
|---|---|---|---|
| 183,315 A | 10/1876 | Mainer | |
| 228,883 A | 6/1880 | Freeman | |
| 613,229 A | 11/1898 | Becker | |
| 667,149 A | 1/1901 | Kenney | |
| 721,985 A | 3/1903 | Wells | |
| 1,045,400 A | 11/1912 | Heyden | |
| 1,550,714 A | * 8/1925 | Stacey, Jr. | ................ 454/306 |
| 1,889,711 A | 11/1932 | Talley et al. | |
| 1,948,909 A | 2/1934 | Evans | |
| 2,572,062 A | * 10/1951 | Sexton | ................ 137/594 |
| 2,810,591 A | 10/1957 | Jacoby | |
| 2,857,108 A | * 10/1958 | Wallace | ................ 237/53 |
| 3,289,567 A | * 12/1966 | Renner | ................ 454/172 |
| 3,872,894 A | 3/1975 | Streit | |
| 4,223,702 A | 9/1980 | Cook | |
| 4,357,860 A | 11/1982 | Krzak | |
| 4,543,677 A | 10/1985 | Haglund et al. | |
| 5,482,505 A | * 1/1996 | Hedlund | ................ 454/65 |
| 6,003,814 A | 12/1999 | Pike et al. | |
| 6,131,960 A | 10/2000 | McHughs | |

* cited by examiner

Primary Examiner—Derek Boles
(74) Attorney, Agent, or Firm—Robert M. Hunter

(57) ABSTRACT

An apparatus and method for ventilating tunnels and other confined spaces. The apparatus includes a telescopic ventline assembly. The telescopic ventline assembly includes a plurality of tubes wherein each inner tube or first intermediate tube is slidably disposed within an second intermediate tube or an outer tube, in a telescoping type arrangement. One method involves constructing a ventilation system that includes a plurality of ventline assemblies. Another method involves using the telescopic ventline to ventilate a tunnel or other confined space, e.g., a mine.

24 Claims, 6 Drawing Sheets

TELESCOPIC VENTLINE

CROSS-REFERENCE TO RELATED APPLICATIONS

This application claims the benefit of U.S. Provisional Application No. 60/328,959, filed Oct. 11, 2001, the disclosure of which application is incorporated by reference as if fully set forth herein.

STATEMENT REGARDING FEDERALLY SPONSORED RESEARCH OR DEVELOPMENT

Not Applicable

BACKGROUND OF THE INVENTION

This invention relates to apparatus and methods for ventilating mines and other tunnels. In particular, the invention relates to a telescopic ventline and its use.

Underground mines and other tunnel projects hang ventilation duct (ventline) to convey fresh air to areas that are being excavated. Ventline typically ranges in diameter from twelve to sixty inches. A large fan or blower located in fresh air is connected to the ventline and pushes or pulls fresh air through the ventline. Ventline is typically fabricated from either metal or glass-reinforced plastic (fiberglass). Fiberglass ventline is lighter and more resistant to denting and other damage. Ventline is commonly shipped and installed in ten- or twenty-foot sections. As a tunnel advances, the ventline must be advanced as well.

When a mine purchases ventline from a manufacturer, the mine is required to pay shipping costs to the mine site, which can be located a great distance from the manufacturer. Because ventline is large in diameter, only a limited amount can be loaded onto a semi trailer. This means that many truckloads of ventline have to be hauled to provide the mine with an adequate supply. This results in a high shipping cost per section of ventline.

Once the ventline is on site, it must be hauled underground on low-profile delivery trucks or by rail, often to the most remote areas of the mine. Because a tunnel is a confined area, delivery trucks and rail cars are limited in the amount of ventline they can carry. This means that many trips are required to a supply mine headings with ventline.

Each conventionally-mined heading can advance as much as thirty linear feet a day. A tunnel boring machine (TBM) can advance over one hundred linear feet per day. This means that a lot of ventline is required to keep pace.

The background art is characterized by U.S. Pat. Nos. 183,315; 228,883; 613,229; 667,149; 721,985; 1,045,400; 1,889,711; 1,948,909; 2,810,591; 3,872,894; 4,223,702; 4,357,860; 4,543,677; 6,003,814; and 6,131,960; the disclosure of which patents are incorporated by reference as if fully set forth herein.

Mainer in U.S. Pat. No. 183,315 discloses a stove pipe joint. This invention is limited in that it requires that a pipe end have studs in one pipe section that fit into slots in another pipe section.

Freeman in U.S. Pat. No. 228,883 discloses a stove pipe. This invention is limited in that it requires that a projection on a tongue fit into one of a plurality of slots in another pipe section.

Becker in U.S. Pat. No. 613,229 discloses a stove pipe coupling. This invention is limited in that it requires that a hook with a bowed shank be used to hold sections of stove pipe together.

Kenney in U.S. Pat. No. 667,149 discloses an apparatus for withdrawing smoke from a burning building. This invention is limited in that no means are provided for establishing a seal between the telescoping sections of the draft tube of the invention.

Wells in U.S. Pat. No. 721,985 discloses a detachable hose coupling. This invention is limited in that incorporation of a substantially U-shaped bail into the coupling is required.

Hayden in U.S. Pat. No. 1,045,400 discloses a stove pipe joint. This invention is limited in that a locking device having a cam and a handle is required.

Talley et al. in U.S. Pat. No. 1,889,711 disclose an extension joint for stove pipes. This invention is limited in that strips having a plurality of tongues are required.

Evans in U.S. Pat. No. 1,948,909 discloses a flexible ventilation tubing. This invention is limited in that a tapered flexible sleeve is required to streamline the airflow in the tubing over the projection of the coupling that holds sections of the tubing together.

Jacoby in U.S. Pat. No. 2,810,591 discloses a quick coupler for sections of irrigation pipe. This invention is limited in that a pivoted latch interlock is required.

Streit in U.S. Pat. No. 3,872,894 discloses a light weight cable housing. This invention is limited in that a complex labyrinth seal is required.

Cook in U.S. Pat. No. 4,223,702 discloses a drain line for recreational vehicles. This invention is limited in that a flexible hose must extend through telescoping rigid wall drain pipe sections.

Krzak in U.S. Pat. No. 4,357,860 discloses a telescoping conduit for pressurized air. This invention is limited in that a roller cage and a wiper seal are required in addition to an O-ring seal.

Haglund et al. in U.S. Pat. No. 4,543,677 disclose an airtight telescoping rigid conduit. This invention is limited in that three ring-shaped bearings and a seal ring having a V-shaped cross section are required.

Pike et al. in U.S. Pat. No. 6,003,814 disclose a double-walled duct assembly. This invention is limited in that double-walled construction and flow-facilitating members are required.

McHughs in U.S. Pat. No. 6,131,960 discloses a packing seal expansion joint comprising first and second tube sections. This invention is limited in that packing material disposed between the tube sections is required.

BRIEF SUMMARY OF THE INVENTION

The purpose of the invention is to provide a cost-effective solution to the problem of ventilating mines and other tunnel projects. One advantage of the invention is that the effective length of a ventline assembly is doubled or tripled, resulting in lower shipping cost per linear foot of ventline. Both the cost of delivering the ventline to the mine site and the cost of delivering it to the mine heading are significantly reduced. Another advantage of the invention is that less time is required to install each foot of ventline. Currently, a worker typically uses a utility truck to lift each section of conventional ventline to the back (roof) of the tunnel and hang it. He then drives back to an underground storage area to retrieve another section of ventline. When a worker installs a ten-foot section of conventional ventline, he gains ten feet of advance. When the invention is used, twenty or thirty feet of advance is achieved for each ten-foot length of telescopic ventline assembly installed. Each time a section of telescopic ventline is pulled ahead, it must be chained up, but the worker saves time by loading, hauling and hoisting fewer individual sections when telescopic ventline is used.

The invention is an apparatus and method for ventilating tunnels and other confined spaces. The apparatus comprises a telescopic ventline assembly as disclosed herein. The telescopic ventline of the present invention comprises a plurality of tubes wherein each inner tube or first intermediate tube is slidably disposed within a second intermediate tube or an outer tube, in a telescoping-type arrangement. The methods comprise installing the the telescopic ventline and using it to ventilate a tunnel or other confined space, e.g., a mine.

A preferred embodiment of the invention is an apparatus for venting a confined space comprising: an outer tube with a first end upon which a first pair of connectors (e.g., transport connectors) is mounted on the exterior thereof and upon which an inside stop is provided on the inside thereof and a second end which is belled (e.g., belled out) and upon which a second pair of connectors (e.g., installation connectors) is mounted; and an inner tube with a first terminus upon which an outside stop is provided on the outside thereof and a second terminus which is belled (e.g., belled out) and upon which a third pair of connectors (e.g., hooking connectors) is mounted on the outside thereof; wherein said inner tube is slidably mounted within said outer tube. In another preferred embodiment, the apparatus further comprises: an intermediate tube with a first ending upon which an interior stop is provided on the interior thereof and a second ending upon which exterior stop is provided on the exterior thereof; wherein the intermediate tube is slidably mounted between the inner tube and the outer tube.

In yet another preferred embodiment of the invention, the belled out end of the outer tube of a first ventline assembly is configured to fit over the belled out terminus of the inner tube of a second ventline assembly. Preferably, an elastomeric molding or gasket is fastened to the outside stop. In a preferred embodiment, the tubes are fabricated from glass reinforced plastic (fiberglass) and the stops are attached to said tubes by any conventional technique, e.g., by gluing the stops onto the tubes, by riveting the stops onto the tubes or by molding the stops into the tubes.

In a preferred embodiment, the invention is a system for venting a tunnel comprising: a fan or blower for producing an airflow; a conduit for said airflow extending from the fan or blower into or out of the tunnel; and a plurality of ventline assemblies connected together and at one end connected to the conduit for carrying the airflow into or out of the tunnel; wherein each ventline assembly comprises an embodiment of the apparatus disclosed herein. Preferably, the system further comprises: one or more elbow components connected to at least one of said ventline assemblies and/or one or more tee components connected to at least one of said ventline assemblies.

Another preferred embodiment of the invention is an apparatus for venting a confined space comprising: an outer tube with a first end upon which a first plurality of connectors is mounted on the exterior thereof and upon which an inside stop is provided on the inside thereof and a second end which is necked down and upon which a second plurality of connectors is mounted; and an inner tube with a first terminus upon which an outside stop is provided on the outside thereof and a second terminus upon which a third plurality of connectors is mounted on the outside thereof; wherein said inner tube is slidably mounted within said outer tube.

Yet another preferred embodiment of the invention is an apparatus for venting a confined space comprising: a first ventline assembly comprising a first outer tube with a first end upon which a first plurality of connectors is mounted on the exterior thereof and upon which an inside stop is provided on the inside thereof and a second end which is belled and upon which a second plurality of connectors are mounted, and a first inner tube with a first terminus upon which an outside stop is provided on the outside thereof and a second terminus which is belled and upon which a third plurality of connectors are mounted on the outside thereof, wherein said first inner tube is slidably mounted within said first outer tube; and a second ventline assembly comprising a second outer tube with another first end upon which another first plurality of connectors is mounted on the exterior thereof and upon which another inside stop is provided on the inside thereof and another second end which is belled and upon which another second plurality of connectors are mounted, and a second inner tube with another first terminus upon which another outside stop is provided on the outside thereof and another second terminus which is belled and upon which a third plurality of connectors are mounted on the outside thereof, wherein said second inner tube is slidably mounted within said second outer tube; wherein the first end of the second ventline is configured to mate with the second terminus of the first ventline.

Another preferred embodiment of the invention is an apparatus for venting a confined space comprising a ventline assembly comprising: an outer tube having a first inside diameter with a first end upon which an inside stop is provided on the inside thereof and a second end which has a second inside diameter upon which a first connector is mounted; an intermediate tube with a first ending upon which an interior stop is provided on the interior thereof and a second ending upon which exterior stop is provided on the exterior thereof; an inner tube having a first outside diameter with a first terminus upon which an outside stop is provided on the outside thereof and a second terminus which has a second outside diameter that is less than the second inside diameter and upon which a second connector is mounted on the outside thereof; wherein the inner tube is slidably mounted within the intermediate tube, the intermediate tube is slidably mounted between the inner tube and the outer tube and within the outer tube. Preferably, at least one gasket is attached to said outer tube and said inside stop is mounted on said outer tube at a greater distance from said first end than said at least one gasket is attached to said outer tube. Preferably, said outside stop comprises of a slotted ring that retains an O-ring that essentially fills the annual space between said inner tube and said outer tube.

Yet another preferred embodiment of the invention is an apparatus for venting a confined space comprising: an outer tube having a first inside diameter with a first end upon which an inside stop is provided on the inside thereof and a second end which has a second inside diameter and upon which a first connector is mounted; and an inner tube having a first outside diameter with a first terminus upon which an outside stop is provided on the outside thereof and a second terminus which has a second outside diameter and upon which a second connector is mounted on the outside thereof; wherein said inner tube is slidably mounted within said outer tube and said second inside diameter is greater than said second outside diameter. Preferably, the apparatus further comprises: an intermediate tube with a first ending upon which an interior stop is provided on the interior thereof and a second ending upon which exterior stop is provided on the exterior thereof; wherein the intermediate tube is slidably mounted between the inner tube and the outer tube. Preferably, the second end of the outer tube of a first ventline assembly is configured to mate with the second terminus of the inner tube of a second ventline assembly. Preferably, at least one gasket is attached to said outer tube said inside stop is mounted on said outer tube at a greater distance from said first end than said at least one gasket is attached to said outer tube. Preferably, said outside stop comprises of a slotted ring that retains an O-ring that essentially fills the annual space between said inner tube and said outer tube.

In a further preferred embodiment, the invention is a method of extending a ventilation system in a tunnel, the method comprising: providing a ventilation system, the ventilation system including a first ventline assembly comprising an outer tube with a first end upon which a pair of transport D-rings is mounted on the exterior thereof and upon which an inside stop is provided on the inside thereof and a second end which is belled (out or in) and upon which a pair of installation D-rings are mounted and an inner tube with a first terminus upon which an outside stop is provided on the outside thereof and a second terminus which is belled (in or out) and upon which a pair of straps with hooks are mounted on the outside thereof; connecting the belled end of the outer tube of the first ventline assembly to a source of fresh air and attaching the outer tube of the first ventline assembly to a structural support in the tunnel; releasing the hooks on the outside of the inner tube of the first ventline assembly from the transport D-rings on the first end of the outer tube of the first ventline assembly; telescoping said first ventline assembly until the interior stop on the inside of the outer tube of the first ventline assembly and the exterior stop on the outside of the inner tube of the first ventline assembly abut or do not abut; and attaching the inner tube of the first ventline assembly to a structural support in the tunnel. In preferred embodiments, it is not necessary to telescope the tubes until the stops abut because the tubes are provided with a seal that blocks the annual space between the tubes along their entire lengths. This embodiment provides for flexibility when different lengths of ducting are needed, e.g., adjacent to corners or tees in the ducting.

In yet another preferred embodiment, the above method further comprises: connecting the belled (out or in) end of the outer tube of a second ventline assembly that is configured generally the same as (similar to) the first ventline assembly to the belled (in or out) terminus of the inner tube of the first ventline assembly (e.g., by means of the installation D-rings and straps with hooks) and attaching the outer tube of the second ventline assembly to a structural support in the tunnel (e.g., with a chain); releasing the hooks on the inner tube of the second assembly from the transport D-rings on the first end of said outer tube of the second ventline assembly; telescoping the second ventline assembly until the interior stop on the inside of the outer tube of the second ventline assembly and the exterior stop on the outside of the inner tube of the second ventline assembly abut or do not abut; and attaching the inner tube of the second ventline assembly to a structural support in the tunnel (e.g., with a chain).

In another preferred embodiment, the invention is a method of ventilating a tunnel or confined space, the method comprising installing an apparatus or system described herein in a tunnel or other confined space and using an apparatus or system described herein to deliver fresh air to a location in a tunnel or other confined space.

The invention may be used in the development and production areas of underground mines as well as in service tunnels and tunnel boring machine projects. Any operation that uses ventilation duct to supply fresh air to work areas would realize cost and labor savings with the shipping and handling of telescopic ventline rather than conventional ventline.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

The following reference numerals are used to indicate the parts and environment of the invention on the drawings:
1 telescopic ventline assembly, ventline assembly, assembly
3 inner tube section, inner tube
5 outer tube section, outer tube
7 female end, belled out end, second end
8 arrow
9 male end, belled out terminus, first terminus
10 installation D-rings, installation connectors
11 transport D-rings, transport connectors
13 rubber straps with hooks, hooking connectors, straps with hooks
14 conduit
15 inside stop
16 fan or blower
17 outside stop
18 chain
19 elastomeric molding or gasket, molding
20 structural support
21 intermediate tube section, intermediate tube
23 first ending
25 interior stop
27 second ending
29 exterior stop
35 first plurality of rivets
37 second plurality of rivets
43 inside end
45 soft rubber or fabric gasket, gasket
47 beveled rubber stop
51 face
55 first rubber seal
57 second rubber seal
59 rubber flap
61 U-shaped rubber seal
63 first end
65 first fabric or rubber gasket
67 second fabric or rubber gasket
69 inner surface
71 slotted ring
73 outer surface
75 first terminus
77 shoulder stop
79 slot
81 O-ring

DETAILED DESCRIPTION OF THE INVENTION

Figure 1:
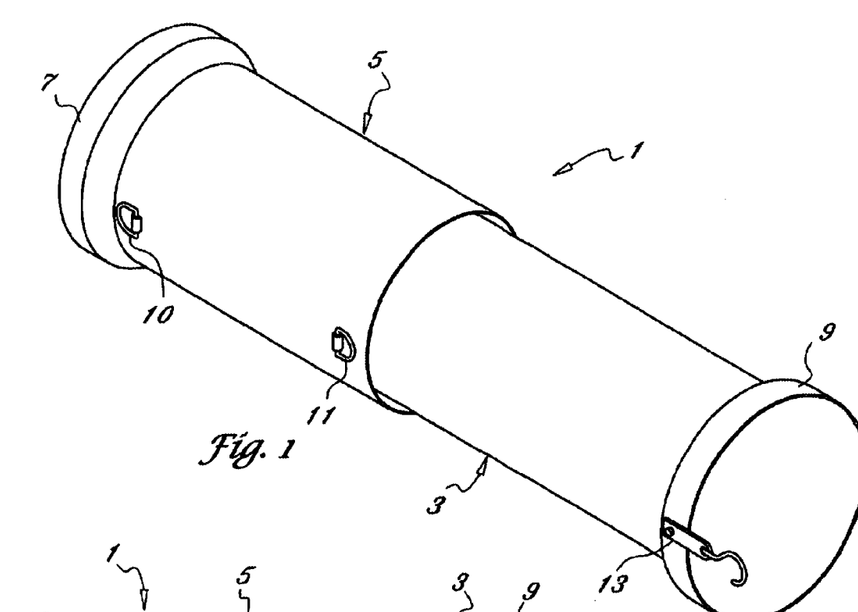
FIG. 1 is a perspective view of a preferred embodiment of the invention.

Referring to FIG. 1, a perspective (not to scale) view of a preferred embodiment of telescopic ventline assembly 1 is presented. Telescopic ventline assembly 1 comprises inner tube section 3 and outer tube section 5. Preferably, both inner tube section 3 and outer tube section are made of fiberglass. Preferably, the length of each section is about ten or twenty feet. Tube sections 3 and 5 may have any cross sectional shape, but are preferably circular in cross section.

With ventline having a nominal diameter of thirty-six inches, for example, outer tube section 5 preferably has an outside diameter of about thirty-six inches and an inner diameter of about thirty-five and one half inches over most of its length, but female end 7 is belled out to an outer diameter of about thirty-six and one half inches and an inner diameter of a little over thirty-six inches. Inner tube section 3 preferably has an outside diameter of a little less than thirty-five and one half inches and an inner diameter of about thirty-five inches over most of its length, but male end 9 is belled out to an outer diameter of about thirty-six inches and an inner diameter of a about thirty-five and one half inches. With this embodiment, when one telescopic ventline assembly 1 is connected to another telescopic ventline assembly 1, male end 9 of one assembly 1 is inserted into female end 7 of the other assembly 1. Preferably, the wall thickness of both tube sections is about one-quarter inch and the tolerance between the outer diameter of inner tube section 3 and the inner diameter of outer tube section 5 are kept as tight as feasible. In general, the larger that the inner diameter is on inner tube section 3, the less restriction is imposed on the airflow through it. This minimizes the reduction in the flow rate of the airflow.

With this embodiment, a plurality (preferably a pair) of installation D-rings 10 and a plurality (preferably a pair) of transport D-rings 11 are attached to the outside surface of outer tube section 5 and a plurality (preferably a pair) of rubber straps with hooks 13 are attached to the outside surface of inner tube section 3. During transport, rubber straps with hooks 13 are connected to transport D-rings 11 to prevent inner tube section 3 from sliding out of outer tube section 5. During installation, rubber straps with hooks 13 on one telescopic ventline assembly 1 are connected to installation D-rings 10 on another telescopic ventline assembly 1 to ensure that male end 9 is held in female end 7 of another telescopic ventline assembly 1.

One having ordinary skill in the art will realize that there are other fastening means that may be used instead of D-rings 10 and 11 and rubber straps with hooks 13. For example, any conventional fastening means, such as an industrial hook and loop (e.g., Velcro®) fastening system, bolts connecting flanges or brackets, or metal hooks connecting with metal eyes, may be used.

One having ordinary skill in the art will realize that there are many ways to form the belled ends of the tube sections. For example, belled female end 7 may be formed on the same mold that the rest of outer tube 5 was formed during a fiberglass lay-up or spray fabrication process. Alternatively, female end 7 may be formed by gluing a larger-diameter segment of tube onto one end of outer tube 5. Belled male end 9 may be formed in the same ways.

One having ordinary skill in the art will also realize that there are many ways of configuring tube sections to allow one end of one assembly 1 to be connected to or inserted into an end of another assembly 1. For example, male end 9 may be fabricated with the same outer and inner diameter as the remainder of inner tube section 3 and female end 7 of outer tube section 5 may be fabricated with a slightly larger inner diameter than the outer diameter of inner tube section 3. Alternatively, female end 7 may be fabricated with the same outer and inner diameter as the remainder of outer tube section 5 and all of inner tube section 3 or just male end 9 of inner tube section 3 may be fabricated with a slightly smaller outer diameter than the inner diameter of female end 7. If the entire length of inner tube section 3 is slidably insertable into outer tube section 5, belling out one end of both tube sections is unnecessary.

One having ordinary skill in the art will also realize that there are many ways to configure the ends of the inner and outer tube sections that allow one end of one assembly 1 to be connected to one end of another assembly 1. For example, in alternative embodiments, a screw connection, a conventional flanged connection or a locking snap connection is used.

Figure 2:
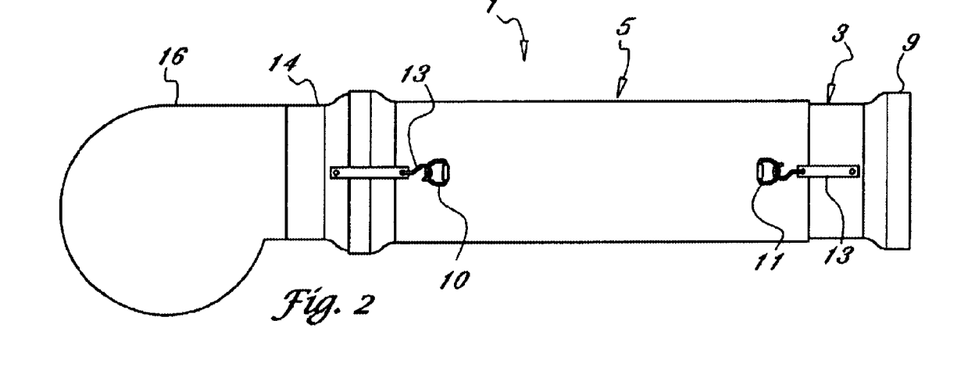
FIG. 2 is a side (elevation) view of a two-section telescopic ventline assembly of a preferred embodiment of the invention.

Referring to FIG. 2, a side (elevation) view of a two-section telescopic ventline assembly of a preferred embodiment of the invention is presented. In this view, a first telescopic ventline assembly 1 is show on the right with first rubber straps with hooks 13 on inner tube section 3 in a transport configuration with first rubber straps with hooks 13 on inner tube section 3 connected to transport D-rings 11 on outer tube section 4. Fan or blower 16 and a conduit 14 are shown on the left with second rubber straps with hooks 13 in an installed configuration with second rubber straps with hooks 13 on conduit 14 connected to installation D-rings 10 on outer tube 5.

Figure 3:
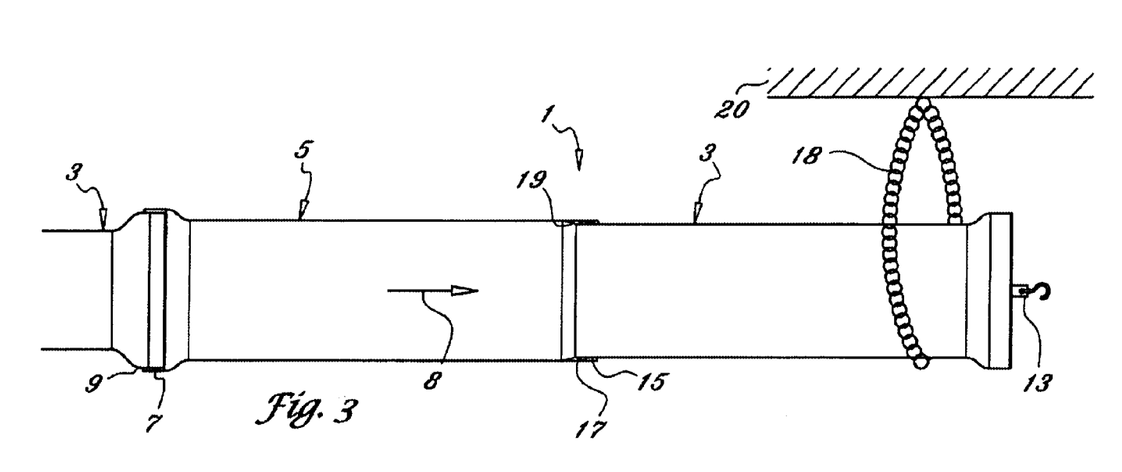
FIG. 3 is a cross-sectional view of an extended, two-section telescopic ventline assembly of a preferred embodiment of the invention.

Referring to FIG. 3, a cross-sectional view of an extended, two-section telescopic ventline assembly of a preferred embodiment of the invention is presented. In this view, female end 7 is of first telescopic ventline 1 is connected to male end 9 of second telescopic ventline 1. The airflow is moving in the direction of arrow 8. Inner tube section 3 of first telescopic ventline 1 is pulled out of outer tube section 5 of first telescopic ventline 1 until inside stop 15 abuts outside stop 17. The presence of inside stop 15 and outside stop 17 prevent inner tube section 3 from sliding all of the way out of outer tube section 5. Elastomeric molding or gasket 19 held in place by outside stop 17 prevents air from passing through the annular space between the exterior surface inner tube section 3 and the interior surface of outer tube section 5. Preferably, elastomeric molding or rubber gasket 19 is held against the interior surface of outer tube section 5 by the airflow. In fabricating the elastomeric molding, any conventional elastomer may be used, including neoprene, nitrile, Hypalon®, natural rubber, Santoprene®, silicone, Tygon® or Viton®t, etc. Rubber straps and hooks 13 are used to secure another telescopic ventline assembly 1 to this one. Chain 18 is used to secure inner tube section 3 to structural support 20.

Figure 4:
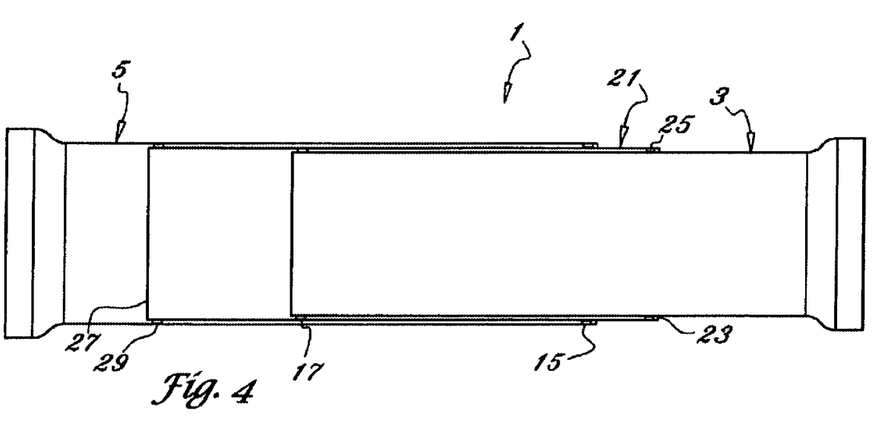
FIG. 4 is a cross-sectional view of an extended, three-section telescopic ventline assembly of a preferred embodiment of the invention.

Referring to FIG. 4, a cross-sectional view of extended, three- section telescopic ventline assembly 1 of a preferred embodiment of the invention is presented. In this view, intermediate tube section 21 is shown disposed between outer tube section 5 and inner tube section 3. Intermediate tube section 21 comprises first ending 23 upon which interior stop 25 is provided on the interior thereof and second ending 27 upon which exterior stop 29 is provided on the exterior thereof. Intermediate tube section 21 is slidably mounted between inner tube 3 and outer tube 5.

Figure 5:
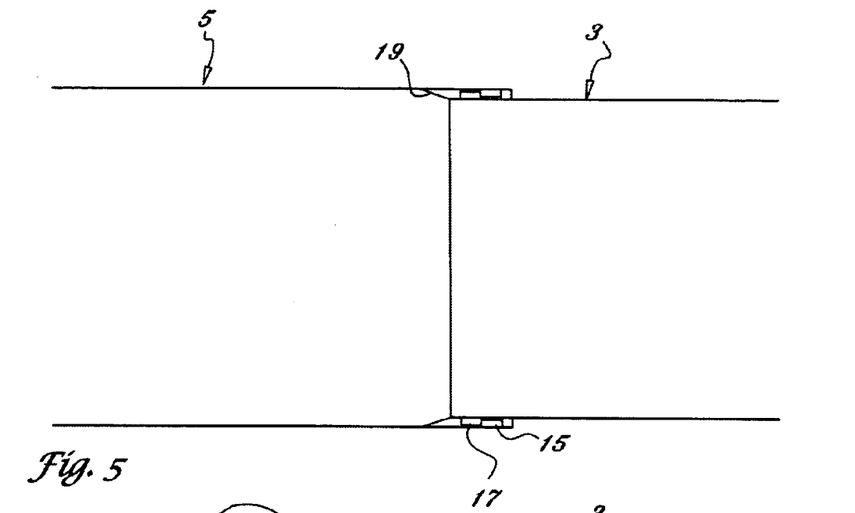
FIG. 5 is a cross-sectional view of the stops on the inner tube and the outer tube of a preferred embodiment of the invention.

Referring to FIG. 5, a cross-sectional view of an alternative embodiment of outside stop 17 on inner tube 3 and inside stop 15 on outer tube 5 of a preferred embodiment of the invention is presented. Elastomeric molding or gasket 19 is shown sealing the gap between the inner tube 3 and outer tube 5, even when inside stop 15 is not abutting outside stop 17.

Figure 6:
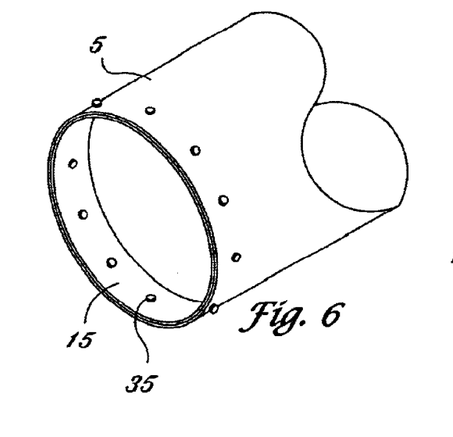
FIG. 6 is a perspective view of the stop on the outer tube of a preferred embodiment of the invention.

Referring to FIG. 6, a perspective view of inside stop 15 on outer tube 5 of a preferred embodiment of the invention is presented. In this embodiment, inside stop 15 is riveted to the inside of outer tube 5 by first plurality of rivets 35.

Figure 7:
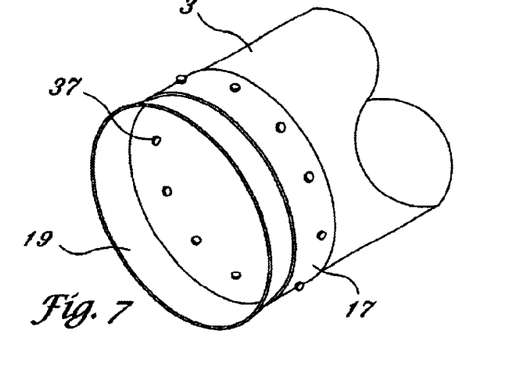
FIG. 7 is a perspective view of the stop on the inner tube of a preferred embodiment of the. invention.

Referring to FIG. 7, a perspective view of outside stop 17 on inner tube 3 of a preferred embodiment of the invention is presented. In this embodiment, outside stop 17 is riveted to the outside of outer tube 3 with second plurality of rivets 37. A portion of elastomeric molding or gasket 19 is held in place between outer tube 3 and outside stop 17 by the same type of rivets that fasten outside stop 17 to inner tube 3.

Figure 8:
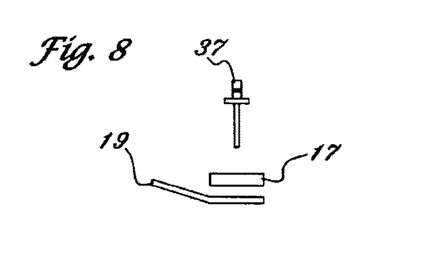
FIG. 8 is an exploded side view of the stop subassembly on the inner tube of a preferred embodiment of the invention.

Referring to FIG. 8 is an exploded side view of the outside stop subassembly that attaches to inner tube 3 of a preferred embodiment of the invention is presented. Second plurality of rivets 37 pass through outside stop 17, through elastomeric molding or gasket 19 and then through the wall of inner tube 3.

Figure 9:
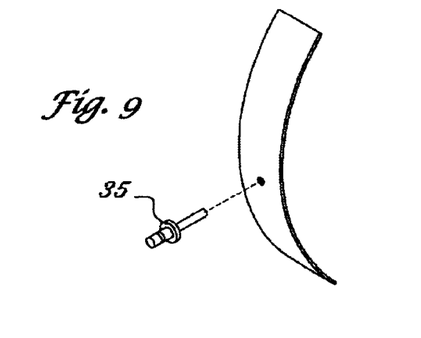
FIG. 9 is an exploded perspective view of the stop subassembly on the outer tube of a preferred embodiment of the invention.

Referring to FIG. 9, an exploded perspective view of the inside stop subassembly that attaches to outer tube 5 of a preferred embodiment of the invention is presented. First plurality of rivets 35 first pass through the wall of outer tube 5 and then through inside stop 15.

Figure 10:
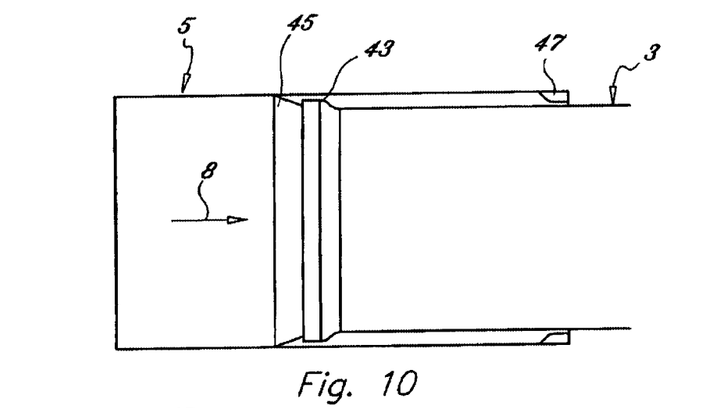
FIG. 10 is a cross-sectional view of the stops on the inner tube and the outer tube of a more preferred embodiment of the invention.

Referring to FIG. 10, a cross-sectional view of outside stop 17 on inner tube 3 and beveled rubber stop 47 on outer tube 5 of a more preferred embodiment of the invention is presented. Airflow is in the direction of arrow 8. In this embodiment, inside end 43 of inner tube 3 is belled out so that the outside diameter of inside end 43 is a slightly less than the inside diameter of outer tube 5. Soft rubber or fabric gasket 45 is attached to inside end 43 and is pushed against the interior of outer tube 5 by the pressure caused by the airflow. Beveled rubber stop 47 is fastened to the interior of outer tube 5 adjacent the end of outer tube 5. Beveled rubber stop 47 is fastened to outer tube 5 by gluing or riveting or other conventional means after inside end 43 is inserted into outer tube 5 during manufacture of assembly 1. More preferably beveled rubber stop 47 is fastened to outer tube 5 by gluing.

Figure 11:
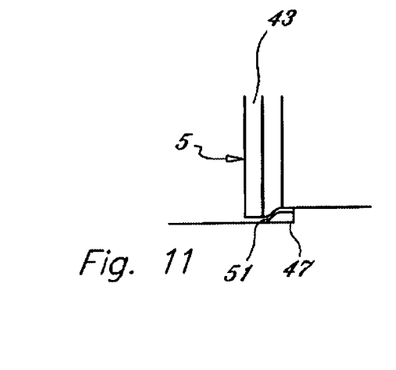
FIG. 11 is a cross-sectional view of the stop on the outer tube of a more preferred embodiment of the invention.

Referring to FIG. 11, a cross-sectional view of beveled rubber stop 47 on the inside surface of outer tube 5 of a more preferred embodiment of the invention is presented. The angle of face 51 of beveled rubber stop 47 is chosen to achieve an optimal seal with the outside surface of inside end 43.

Figure 12:
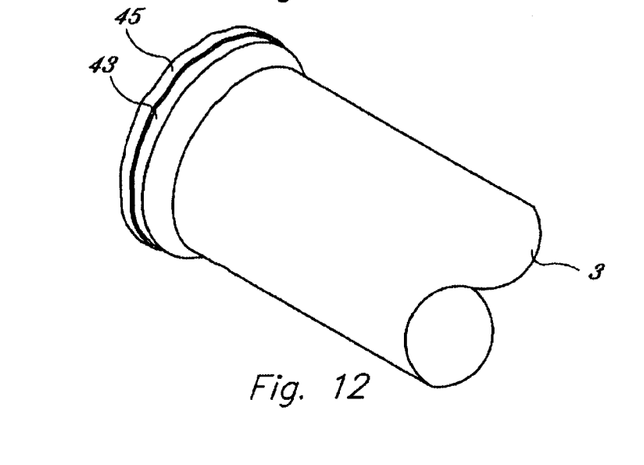
FIG. 12 is a perspective view of the gasket formed on the outer surface of the inner tube of a preferred embodiment of the invention.

Referring to FIG. 12, a perspective view of soft rubber or fabric gasket 45 attached to the outer surface of inside end 43 of inner tube 3 of a preferred embodiment of the invention is presented. Gasket 45 is attached to inside end 43 with fiberglass when inner tube 3 is formed.

Figure 13:
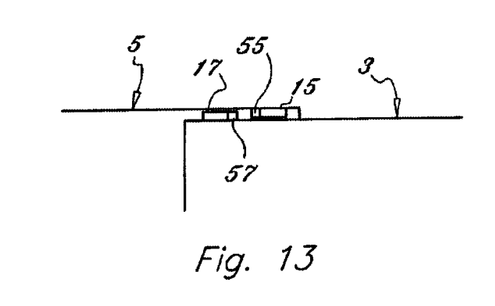
FIG. 13 is a partial cross-sectional view of the stops on the inner tube and the outer tube of an alternative embodiment of the invention.

Referring to FIG. 13, a partial cross-sectional view of the stops on inner tube 3 and outer tube 5 of an alternative embodiment of the invention is presented. With this embodiment, inside stop 15, which may be constructed of plastic or metal, is faced with first rubber seal 55 and outside stop 17, which also may be constructed of plastic or metal, is faced with second rubber seal 57. Rubber seals 55 and 57 abut when stops 15 and 17 are pushed together.

Figure 14:
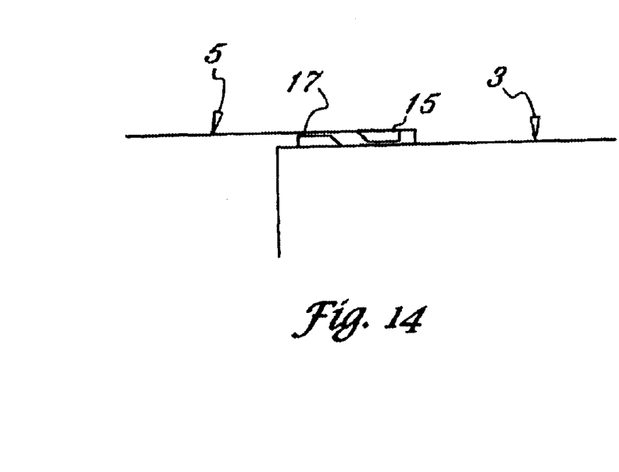
FIG. 14 is a partial cross-sectional view of the stops on the inner tube and the outer tube of another alternative embodiment of the invention.

Referring to FIG. 14, a partial cross-sectional view of the stops on inner tube 3 and outer tube 5 of another alternative embodiment of the invention is presented. With this embodiment, inside stop 15 and outside stop 17 are both beveled and made of rubber. When the stops abut, an air-tight seal is produced.

Figure 15:
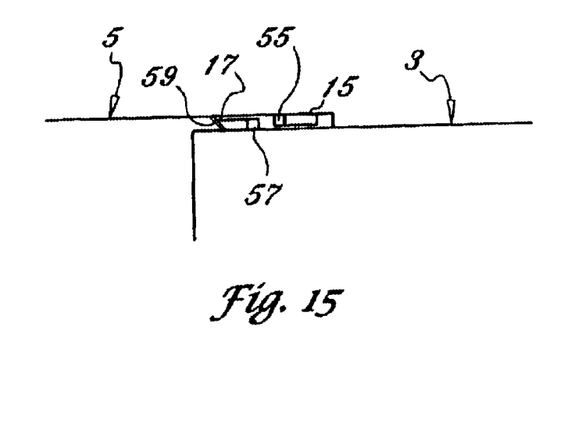
FIG. 15 is a partial cross-sectional view of the stops on the inner tube and the outer tube of another alternative embodiment of the invention.

Referring to FIG. 15, a partial cross-sectional view of the stops on inner tube 3 and outer tube 5 of another alternative embodiment of the invention is presented. With this embodiment, inside stop 15 is faced with first rubber seal 55 and outside stop 17 has a sloping face that is faced with second rubber seal 57. Rubber seals 55 and 57 abut when stops 15 and 17 are pushed together. Even when stops 15 and 17 are not pushed together, air pressure pushes rubber flap 59 against the interior surface of outer tube 5, forming a seal. This feature allows the union between the sections of telescopic ventline assembly 1 to seal when assembly 1 is not fully telescoped and may be used in conjunction with more preferred stop designs.

Figure 16:
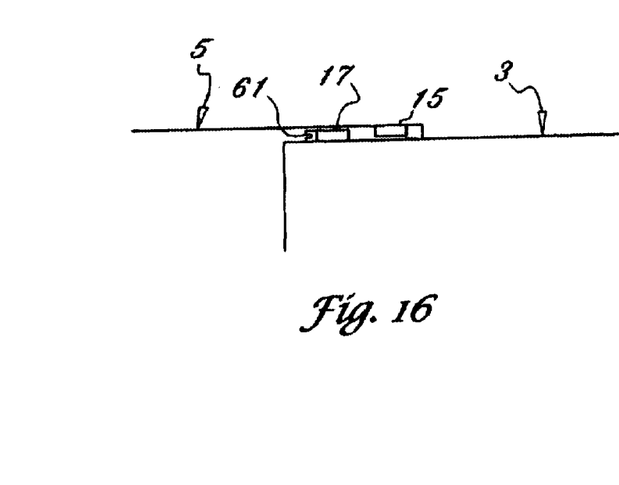
FIG. 16 is a partial cross-sectional view of the stops on the inner tube and the outer tube of another alternative embodiment of the invention.
Figure 17:
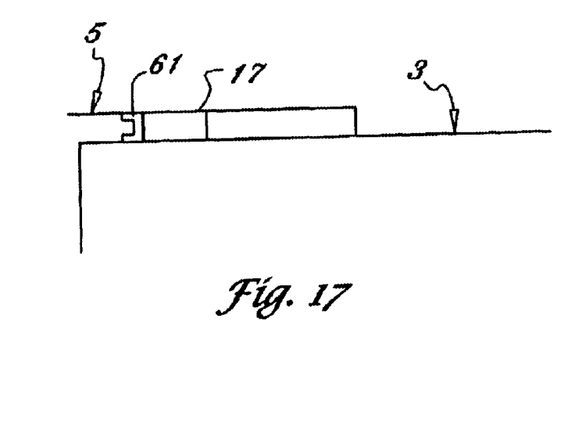
FIG. 17 is a partial cross-sectional view of the stop on the inner tube of the alternative embodiment of the invention illustrated in FIG. 16.

Referring to FIG. 16, a partial cross-sectional view of the stops on inner tube 3 and outer tube 5 of another alternative embodiment of the invention is presented. FIG. 17 is a partial cross-sectional view of the stop on inner tube 3 of the alternative embodiment of the invention illustrated in FIG. 16. With this embodiment, outside stop 17 is faced with U-shaped rubber seal 61. When the airflow applies air pressure to U-shaped rubber seal 61, the seal deforms to prevent air from flowing between inner tube 3 and outer tube 5 in the same way that oil seals prevent oil flow past pistons in engines.

Figures 18, 19, 20:
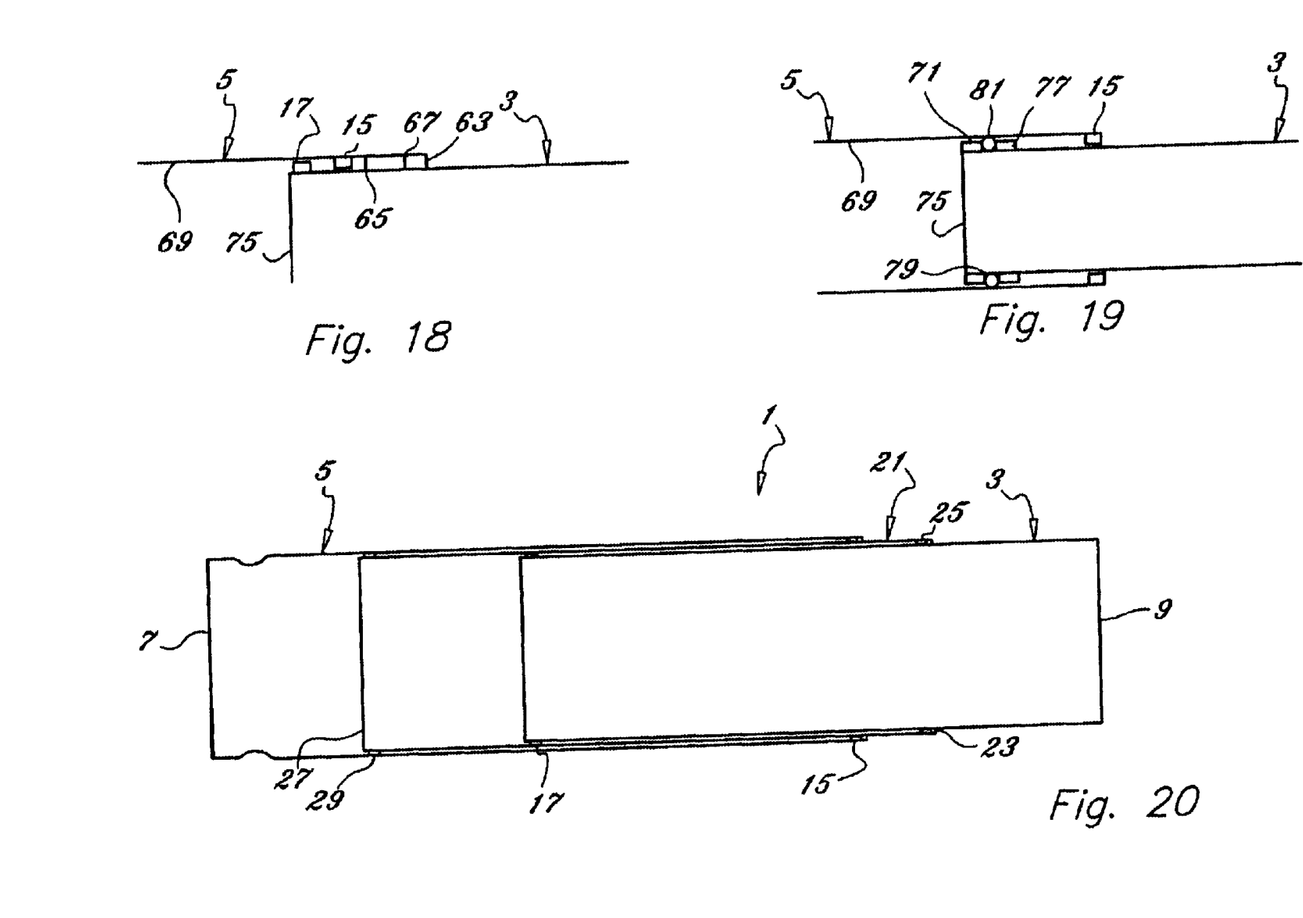
FIG. 18 is a partial cross-sectional view of the ends of the inner tube and the outer tube of another preferred embodiment of the invention.
FIG. 19 is a cross-sectional view of the ends of the inner tube and the outer tube of another preferred embodiment of the invention.
FIG. 20 is a cross-sectional view of an alternative embodiment of a ventline assembly comprising three tubes.

Referring to FIG. 18, a partial cross-sectional view of the ends of inner tube 3 and outer tube 5 of another preferred embodiment of the invention is presented. In this embodiment, inside stop 15 is located a relatively greater distance from first end 63 than first fabric or rubber gasket 65 and second fabric or rubber gasket 67 are located from first end 63. In this embodiment, stops 15 and 17 abut when inner tube 3 and outer tube 5 are telescoped to the maximum possible extent. In an alternative embodiment, inside stop 15 is located a relatively lesser distance from first end 63 than first fabric or rubber gasket 65 and second fabric or rubber gasket 67 are located from first end 63. In this alternative embodiment, stop 17 would be spaced from first terminus 75 of inner tube 3 allowing first fabric or rubber gasket 65 and second fabric or rubber gasket 67 to seal against the outside surface of inner tube 3.

Preferably, during manufacture, the fabric or rubber material used to form fabric or rubber gaskets 65 and 67 is folded in half lengthwise before it is taped to the mandrill upon which outer tube 5 is formed. The resin in the fiberglass applied to the mandrill to form outer tube 5 effectively glues fabric or rubber gaskets 65 and 67 to inner surface 69 of outer tube 5. In a preferred embodiment, the process of making the embodiment of FIG. 18 comprises: wrapping a four-inch wide fiber gasket around the mandrill; applying tape to two inches (half or one side) of the gasket all the way around the mandrill; folding the untaped half of the gasket over on the taped side; applying resin and fiber strands to form outer tube 5; and pulling the finished outer tube 5 off of the mandrill.

Referring to FIG. 19, a cross-sectional view of the ends of inner tube 3 and outer tube 5 of another preferred embodiment of the invention is presented. In this embodiment, slotted ring 71 is attached to outer surface 73 of first terminus 75 of inner tube 3. Slotted ring 71 has shoulder stop 77 which abuts with inside stop 15 when inner tube 3 and outer tube 5 are telescoped to the maximum possible extent. Slotted ring 71 has slot 79 into which O-ring 81 is installed. O-ring 81 presses against inner surface 69 of outer tube 5 both when shoulder stop 77 abuts inside stop 15 and when should stop 77 does not abut inside stop 15. This embodiment is particularly advantageous in applications in which inner tube 3 and outer tube 5 are not telescoped to the maximum possible extent, e.g., when inner tube 3 is temporarily retracted away from a blast area. It is also advantageous in negative pressure applications which occur when air is being sucked through inner tube 3 and outer tube 5 instead of being blown through inner tube 3 and outer tube 5.

Referring to FIG. 20 is a cross-sectional view of an alternative embodiment of a ventline assembly comprising three tubes is presented. In this embodiment, male end 9 of one ventline assembly is not increased in diameter (belled out) but is still configured to mate with (fit inside) female end 7 of another ventline assembly. In this embodiment, female end 7 is necked down (belled in) instead of being belled out as is the case in other embodiments. The belled in portion at female end 7 provides a female portion of outer tube 5 that couples (mates) with a male portion of inner tube 3 at male end 9. In another alternative embodiment, the belled portion at second end 7 provides a male portion of outer tube 5 that couples (mates) with a female portion of inner tube 3 at first terminus 9.

Operation of a preferred embodiment of the invention involves a first step of providing a ventilation system, the ventilation system including first ventline assembly 1 comprising outer tube 5 with a first end upon which a pair of transport D-rings 11 is mounted on the exterior thereof and upon which inside stop 15 is provided on the inside thereof and second end 7 which is belled out and upon which a pair of installation D-rings 10 are mounted and inner tube 3 with a first terminus upon which outside stop 17 is provided on the outside thereof and a second terminus which is belled out and upon which a pair of straps with hooks 13 are mounted on the outside thereof. A second step involves connecting belled out end 7 of outer tube 5 of the first ventline assembly to a source of fresh air (e.g., fan or blower 16 or conduit 14 from fan or blower 16) and attaching outer tube 5 of first ventline assembly 1 to structural support 20 in the tunnel; releasing straps with hooks 13 on the outside of inner tube 3 of first ventline assembly 1 from transport D-rings 11 on the first end of outer tube 5 of first ventline assembly 1. A third step involves telescoping first ventline assembly 1 until inside stop 15 on the inside of outer tube 5 of first ventline assembly 1 and outside stop 17 on the outside of inner tube 3 of first ventline assembly 1 abut. A fourth step involves attaching inner tube 3 of first ventline assembly 1 to structural support 20 in the tunnel.

In yet another preferred embodiment, the above method further comprises the fifth step of connecting belled out end 7 of outer tube 5 of second ventline assembly 1 that is configured generally the same as first ventline assembly 1 to the belled out terminus 9 of inner tube 3 of the first ventline assembly i and attaching outer tube 5 of second ventline assembly 1 to structural support 20 in the tunnel. The method also involves a sixth step of releasing rubber straps with hooks 13 on inner tube 3 of second assembly 1 from transport D-rings 11 on the first end of outer tube 5 of second ventline assembly 1. The method also involves a sixth step of telescoping second ventline assembly 1 until inside stop 15 on the inside of outer tube 5 of second ventline assembly 1 and outside stop 17 on the outside of inner tube 3 of second ventline assembly 1 abut. The method also involves the step of attaching inner tube 3 of second ventline assembly 1 to structural support 20 in the tunnel.

In another preferred embodiment, the invention is a method of ventilating a tunnel or confined space. The method comprises using assembly 1 or a system comprising assembly 1 to deliver fresh air to a location in a tunnel or other confined space.

Many variations of the invention will occur to those skilled in the art. Some variations include a telescopic ventline having two or three sections. Other variations call for a telescopic ventlines having more than three sections. Yet others involve ventlines having other than circular cross sections. All such variations are intended to be within the scope and spirit of the invention.

What is claimed is:

1. An apparatus for venting a confined space comprising:
   an outer tube with a first end upon which a first pair of connectors is mounted on the exterior thereof arid upon which an inside stop is provided on the inside thereof and a second end which is belled out and upon which a second pair of connectors are mounted; and
   an inner tube with a first terminus upon which an outside stop is provided on the outside thereof and a second terminus which is belled out and upon which a third pair of connectors are mounted on the outside thereof; wherein said inner tube is slidably mounted within said outer tube.

2. The apparatus of claim 1 further comprising:
an intermediate tube with a first ending upon which an interior stop is provided on the interior thereof and a second ending upon which exterior stop is provided on the exterior thereof; wherein the intermediate tube is slidably mounted between the inner tube and the outer tube.

3. The apparatus of claim 1 wherein the belled out end of the outer tube of a first ventline assembly is configured to fit over the belled out terminus of the inner tube of a second ventline assembly.

4. The apparatus of claim 1 wherein an elastomeric molding or gasket is fastened to the outside stop.

5. The apparatus of claim 1 wherein the tubes are fabricated from glass reinforced plastic and the stops are attached to said tubes by a technique selected from the group consisting of gluing the stops onto the tubes, riveting the stops onto the tubes and molding the stops into the tubes.

6. A system for venting a tunnel comprising:
a fan or blower for producing an airflow;
a conduit for said airflow extending from the fan or blower into the tunnel; and
a plurality of ventline assemblies connected together and at one end connected to the conduit for carrying the airflow into the tunnel;
wherein each ventline assembly comprises the apparatus of claim 1.

7. The system of claim 6 further comprising: an elbow component connected to at least one of said ventline assemblies.

8. The system of claim 6 further comprising: a tee component connected to at least one of said ventline assemblies.

9. An apparatus for venting a confined space comprising:
an outer tube with a first end upon which a first plurality of connectors is mounted on the exterior thereof and upon which an inside stop is provided on the inside thereof and a second end which is necked down and upon which a second plurality of connectors are mounted; and
an inner tube with a first terminus upon which an outside stop is provided on the outside thereof and a second terminus upon which a third plurality of connectors are mounted on the outside thereof;
wherein said inner tube is slidably mounted within said outer tube.

10. An apparatus for venting a confined space comprising:
a first ventline assembly comprising:
    a first outer tube with a first end upon which a first plurality of connectors is mounted on the exterior thereof and upon which an inside stop is provided on the inside thereof and a second end which is belled and upon which a second plurality of connectors are mounted, and
    a first inner tube with a first terminus upon which an outside stop is provided on the outside thereof and a second terminus which is belled and upon which a third plurality of connectors are mounted on the outside thereof,
    wherein said first inner tube is slidably mounted within said first outer tube; and a second ventline assembly comprising:
    a second outer tube with another first end upon which another first plurality of connectors is mounted on the exterior thereof and upon which another inside stop is provided on the inside thereof and another second end which is belled and upon which another second plurality of connectors are mounted, and
    a second inner tube with another first terminus upon which another outside stop is provided on the outside thereof and another second terminus which is belled and upon which a third plurality of connectors are mounted on the outside thereof,
    wherein said second inner tube is slidably mounted within said second outer tube;
wherein the first end of the second ventline is configured to mate with the second terminus of the first ventline.

11. An apparatus for venting a confined space comprising a ventline assembly comprising:
an outer tube having a first inside diameter with a first end upon which an inside stop is provided on the inside thereof and a second end which has a second inside diameter upon which a first connector is mounted;
an intermediate tube with a first ending upon which an interior stop is provided on the interior thereof and a second ending upon which exterior stop is provided on the exterior thereof;
an inner tube having a first outside diameter with a first terminus upon which an outside stop is provided on the outside thereof and a second terminus which has a second outside diameter that is less than the second inside diameter and upon which a second connector is mounted on the outside thereof;
wherein the inner tube is slidably mounted within the intermediate tube, the intermediate tube is slidably mounted between the inner tube and the outer tube and within the outer tube.

12. The apparatus of claim 11 wherein at least one gasket is attached to said outer tube and said inside stop is mounted on said outer tube at a greater distance from said first end than said at least one gasket is attached to said outer tube.

13. The apparatus of claim 11 wherein said outside stop comprises of a slotted ring that retains an O-ring that essentially fills the annual space between said inner tube and said outer tube.

14. An apparatus for venting a confined space comprising:
an outer tube having a first inside diameter with a first end upon which an inside stop is provided on the inside thereof and a second end which has a second inside diameter and upon which a first connector is mounted; and
an inner tube having a first outside diameter with a first terminus upon which an outside stop is provided on the outside thereof and a second terminus which has a second outside diameter and upon which a second connector is mounted on the outside thereof;
wherein said inner tube is slidably mounted within said outer tube and said second inside diameter is greater than said second outside diameter.

15. The apparatus of claim 14 further comprising:
an intermediate tube with a first ending upon which an interior stop is provided on the interior thereof and a second ending upon which exterior stop is provided on the exterior thereof; wherein the intermediate tube is slidably mounted between the inner tube and the outer tube.

16. The apparatus of claim 14 wherein the second end of the outer tube of a first ventline assembly is configured to mate with the second terminus of the inner tube of a second ventline assembly.

17. The apparatus of claim 14 wherein at least one gasket is attached to said outer tube said inside stop is mounted on said outer tube at a greater distance from said first end than said at least one gasket is attached to said outer tube.

18. The apparatus of claim 14 wherein said outside stop comprises of a slotted ring that retains an O-ring that essentially fills the annual space between said inner tube and said outer tube.

19. A method of extending a ventilation system in a tunnel, the method comprising:

providing a ventilation system, the ventilation system including a first ventline assembly comprising an outer tube with a first end upon which a pair of transport D-rings is mounted on the exterior thereof and upon which an inside stop is provided on the inside thereof and a second end which is belled and upon which a pair of installation D-rings are mounted and an inner tube with a first terminus upon which an outside stop is provided on the outside thereof and a second terminus which is belled and upon which a pair of straps with hooks are mounted on the outside thereof;

connecting the belled end of the outer tube of the first ventline assembly to a source of fresh air and attaching the outer tube of the first ventline assembly to a structural support in the tunnel;

releasing the hooks on the outside of the inner tube of the first ventline assembly from the transport D-rings on the first end of the outer tube of the first ventline assembly;

telescoping said first ventline assembly until the interior stop on the inside of the outer tube of the first ventline assembly and the exterior stop on the outside of the inner tube of the first ventline assembly do or do not abut but remain spaced from one another; and attaching the inner tube of the first ventline assembly to a structural support in the tunnel.

20. The method of claim 19 further comprising:

connecting the belled end of the outer tube of a second ventline assembly that is configured similar to the first ventline assembly to the belled terminus of the inner tube of the first ventline assembly and attaching the outer tube of the second ventline assembly to a structural support in the tunnel;

releasing the hooks on the inner tube of the second assembly from the transport D-rings on the first end of said outer tube of the second ventline assembly;

telescoping the second ventline assembly until the interior stop on the inside of the outer tube of the second ventline assembly and the exterior stop on the outside of the inner tube of the second ventline assembly abut or do not abut but remained spaced from one another; and attaching the inner tube of the second ventline assembly to a structural support in the tunnel.

21. A method of ventilating a tunnel or confined space, the method comprising:

installing the system of claim 6 in a tunnel or other confined space; and using the system to deliver fresh air to a location in the tunnel or other confined space.

22. A method of ventilating a tunnel or confined space, the method comprising:

installing the apparatus of claim 9 in a tunnel or other confined space; and using the apparatus to deliver fresh air to a location in the tunnel or other confined space.

23. A method of ventilating a tunnel or confined space, the method comprising:

installing the apparatus of claim 11 in a tunnel or other confined space; and using the apparatus to deliver fresh air to a location in the tunnel or other confined space.

24. A method of ventilating a tunnel or confined space, the method comprising:

installing the apparatus of claim 14 in a tunnel or other confined space; and using the apparatus to deliver fresh air to a location in the tunnel or other confined space.

* * * * *